US008032191B2

(12) United States Patent
Yang

(10) Patent No.: US 8,032,191 B2
(45) Date of Patent: Oct. 4, 2011

(54) SPEAKER WITH EARPHONE FUNCTION

(75) Inventor: Jen-Han Yang, Taipei (TW)

(73) Assignees: Jen-Han Yang, Taipei (TW); Yu-Hsuan Yang, Taipei (TW)

( * ) Notice: Subject to any disclaimer, the term of this patent is extended or adjusted under 35 U.S.C. 154(b) by 422 days.

(21) Appl. No.: 12/397,430

(22) Filed: Mar. 4, 2009

(65) Prior Publication Data

US 2009/0233652 A1 Sep. 17, 2009

(30) Foreign Application Priority Data

Mar. 17, 2008 (TW) ............................... 97204586 U

(51) Int. Cl.
*H04M 1/00* (2006.01)

(52) U.S. Cl. ...................... 455/575.2; 381/380; 381/384

(58) Field of Classification Search ............... 455/575.2; 381/380, 370, 374, 384; 181/135, 130, 128, 181/129

See application file for complete search history.

(56) References Cited

U.S. PATENT DOCUMENTS

2008/0107299 A1* 5/2008 Lin ................................ 381/380
2008/0240486 A1* 10/2008 Garcia et al. .................. 381/380

* cited by examiner

*Primary Examiner* — Anh Tran

(57) ABSTRACT

A speaker with an earphone function comprises a main body, magnet, washer, voice coil, diaphragm, front cover, rear cover and sound tube; it is characterized in that a conventional earphone housing is integrated with a housing of a speaker unit used in an earphone to enable the main body to be used as the speaker housing concurrently so as to save the production material and cost of a speaker housing, and a speaker assembly and the an earphone assembly can be completed at one time so as to reduce the earphone assembly cost. Furthermore, a diameter of a diaphragm can be relatively increased and a length of an earphone front chamber in front of the diaphragm can be shortened so that the bass quality can be elevated and the alt loss can be decreased.

18 Claims, 3 Drawing Sheets

SPEAKER WITH EARPHONE FUNCTION

BACKGROUND OF THE INVENTION

1. Field of the Invention

The present invention relates to an earphone, and more particularly to a structure capable of simplifying the earphone, and a structure allowing the earphone to have a better sound effect.

2. Description of Related Art

A portable electronic device with a voice output function such as cellular phone or AV player may mostly be coupled to an earphone to provide a user with a better voice listening function.

A speaker unit must be coupled into a housing of a general earphone to be used as a voice output unit. As an example, an insert type earphone disclosed by Taiwan Patent No. M324935 comprises a housing, a rear portion of the housing is disposed with an indentation portion, a sounding element is fixed in the housing, and the sounding element is connected with a lead. There are various patents concerning speaker unit, for example, a frame structure for a mini-earphone speaker disclosed in Taiwan Patent No. 68550 and an earphone type loudspeaker disclosed in Taiwan Patent No. 504099.

In the earphone type loudspeaker mentioned above, components such as a magnet, a pole piece, a voice coil, a diaphragm and a protection cover are placed in sequence in a central ring indentation portion of a bottom shell thereof, a bottom of a rim wall of the bottom shell is coupled to a terminal strip for allowing pair wiring of the voice coil to be passed through and bonded thereon and a circumference of the diaphragm is further pre-stuck with a metal ring; an annular rim face of the bottom shell is formed to be a open plain portion, and sizes of the components such as the diaphragm, the metal ring and the protection cover are also allowed to be extended to a diameter size of the bottom shell to enable the diaphragm to be attached along the plain portion of the annular rim face of the bottom shell to form an even-jointed combination to expand an area of the diaphragm and further to obtain an effect of a broader compass of voice.

The earphone type loudspeaker mentioned above is still necessary to be coupled to the earphone shell to assemble into an earphone, and the diaphragm must be pre-stuck with a metal ring; it will increase the material and assembly costs. Moreover, there is no design of rear resonant chamber in the earphone type loudspeaker; the earphone will not obtain a better bass effect.

SUMMARY OF THE INVENTION

For further improving an earphone structure, and allowing an earphone to generate a better sound effect, the present invention is proposed.

The main object of the present invention is to provide a speaker with an earphone function, allowing a housing of an earphone to be integrated with a speaker unit, a housing of the speaker not to be needed and capable of saving an earphone material and the assembly cost.

Another object of the present invention is to provide a speaker with an earphone function, allowing a housing of an earphone to be integrated with a speaker unit to enable the earphone to generate a better sound effect.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
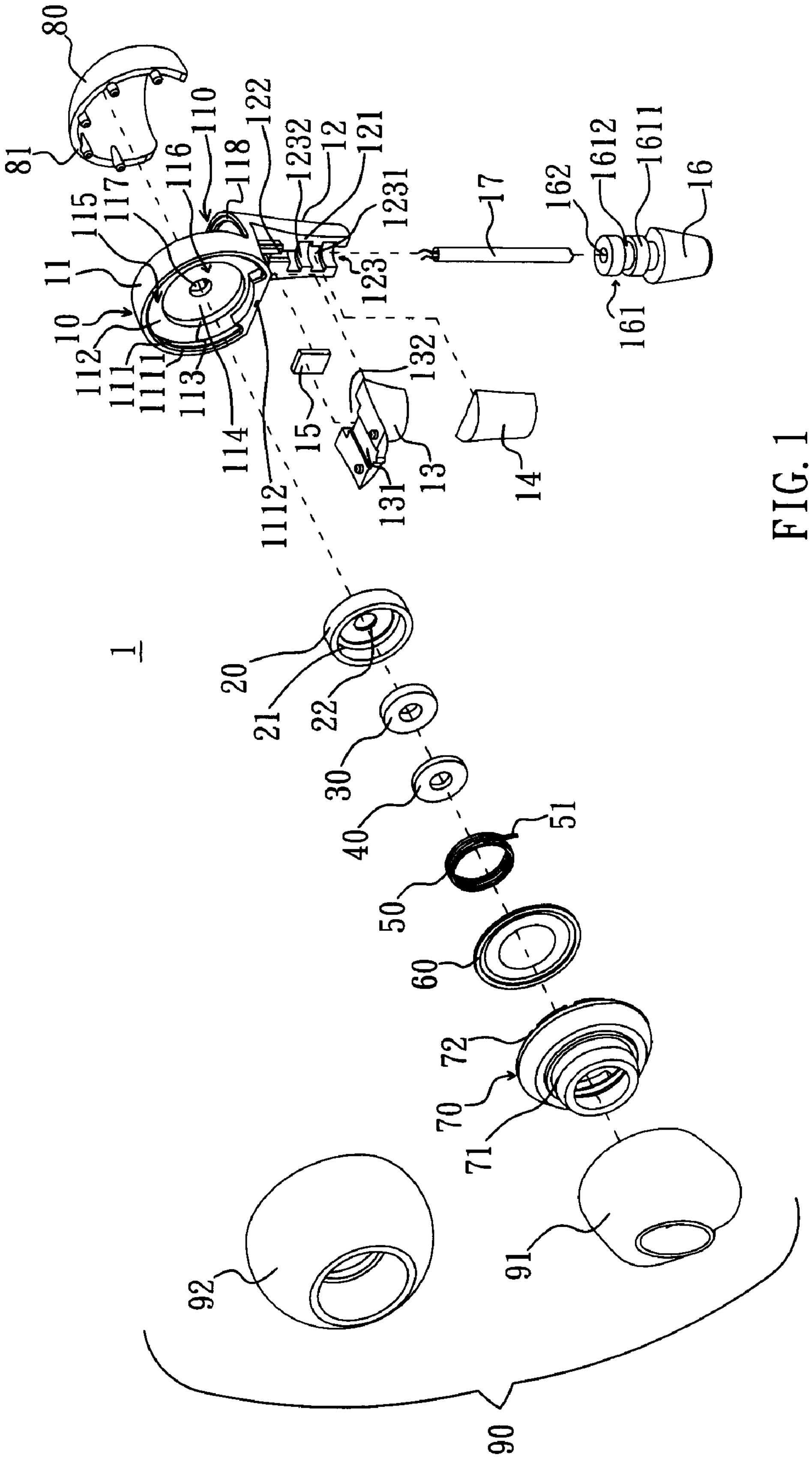
FIG. 1 is an exploded view, showing a speaker with an earphone function according to the present invention.

Please refer to FIG. 1. A speaker 1 with an earphone function of a preferred embodiment according to the present invention comprises a main body 10, a round iron 20, a magnet 30, a washer 40, a voice coil 50, a diaphragm 60, a front cover 70, a rear cover 80 and a sound tube 90. The sound tube may be a first sound tube 91 or a second sound tube 92.

The main body 10 is disposed with a first portion 11 and a second portion 12, a lower end of the first portion 11 and a upper end of the second portion 12 are connected with each other. A front end of the first portion 11 is disposed with a first groove wall 111, a first platform 112, a second groove wall 113 and a second platform 114 connected to each other in sequence, in which the first groove wall 111 is connected to the first platform 112 to form a first groove 115, and the second groove wall 113 is connected to the second platform 114 to form a second groove 116. The first groove 115 and the second groove 116 are communicated with each other. One end of the first groove wall 111 is disposed with a first coupling unit 1111, and a lower end thereof is disposed with a first slot 1112. A middle part of the second platform 114 is disposed with a first through hole 117. A rear end of the first portion 11 is disposed with a second coupling unit 118. One end of the second portion 12 is disposed with a third platform 121. The third platform 121 is disposed with a first accepting groove 122 and a first buckling groove 123. The first buckling groove 123 is provided with at least two different depths of first and second cannelures 1231, 1232. The first accepting groove 122 and the first buckling groove 123 are communicated with each other and positioned on a middle place of the third platform 121. The first buckling groove 123 is extended up to a lower side of the second portion 12.

The round iron 20 is disposed with an accepting groove 21 and the second through hole 22. The round iron 20 is placed on the second groove 116 and extended up to the first groove 115. The second through hole 22 and the first through hole 117 are communicated with each other. The front cover 70 is disposed with a front coupling unit 71, a rear coupling unit 72 and a raised blocking portion 73. The raised blocking portion 73 is placed on an inner side of the rear coupling unit 72. The washer 40 is adhered to the magnet 30. The magnet 30 and the washer 40 respectively are annular and placed in the accepting groove 21 in sequence. The voice coil 50 is put around peripheries of the magnet 30 and the washer 40. The diaphragm 60 is adhered to the voice coil 50. The diaphragm 60 is placed in front of the voice coil 50 and the washer 40. The rear coupling unit 72 of the front cover 70 is coupled to the first coupling unit 1111 of the first portion 11, and the raised blocking portion 73 is pressed against a periphery of the diaphragm 60 to allow the diaphragm 60, the voice coil 50, the washer 40, the magnet 30 and the ring iron 20 to be fixed between the first portion 11 and the front cover 70; the front coupling unit 71 may be coupled to the first sound tube 91 or the second sound tube 92. The rear coupling unit 72 and the first coupling unit 1111 may respectively be corresponding buckling groove and buckling tenon.

The rear cover 80 is a curved shape and is disposed with a third coupling unit 81 corresponding to the second coupling unit 118. The second coupling unit 118 is coupled to the third coupling unit 81 to allow the rear cover 80 to be coupled to the first portion 11 to form a resonant chamber 110; the resonant chamber 110 is communicated with the first through hole 117. The second coupling unit 118 and the third coupling unit 81 may respectively be a buckling groove and a coupling tenon corresponding to each other.

Figure 2:
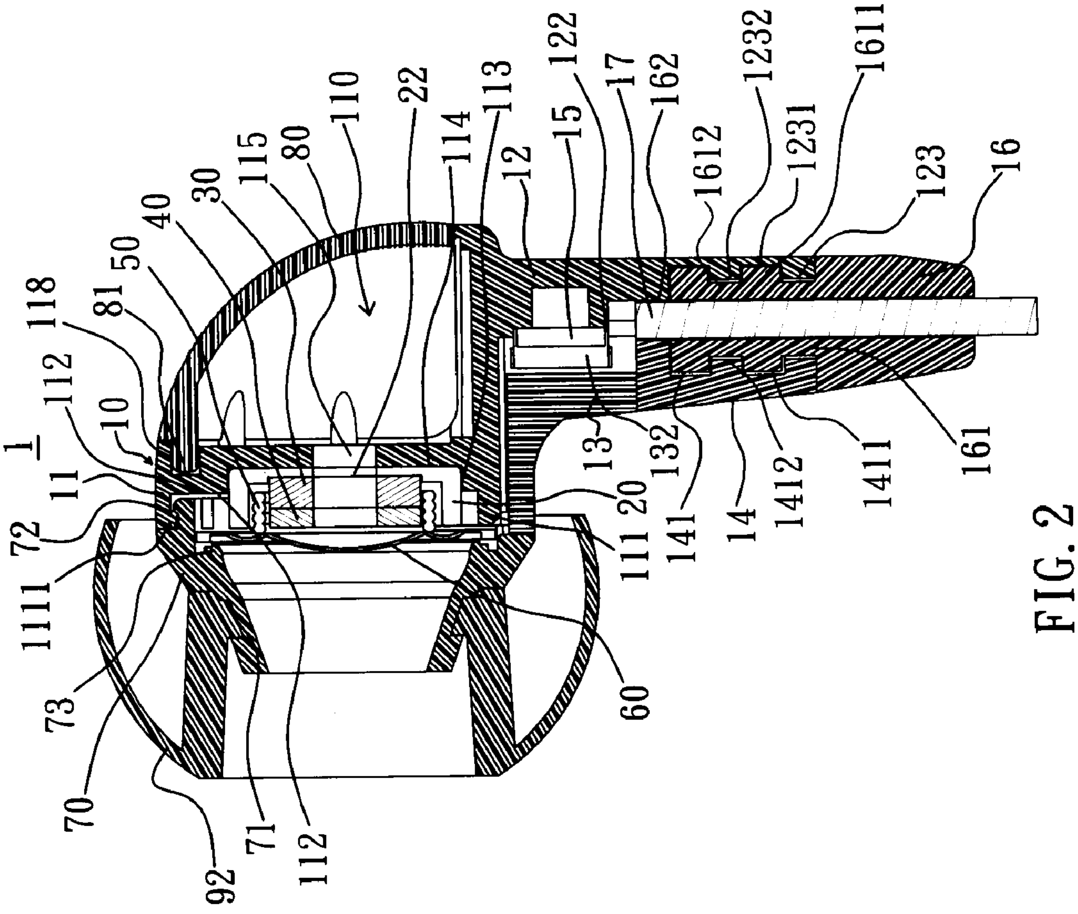
FIG. 2 is a cross sectional view, showing a speaker with an earphone function according to the present invention.

The third platform 121 is respectively coupled to a sheet cover 13 and a blocking cover 14. The sheet cover 13 is disposed with a second slot 131 and a second accepting groove 132 respectively corresponding to the first slot 1112 and the first accepting groove 122. The blocking cover 14 is disposed with a second buckling groove 141 corresponding to the first buckling groove 123. The second buckling groove 141 is disposed with at least two different depths of second cannelures 1411, 1412; the second cannelures 1411, 1412 are respectively corresponding to the first cannelures 1231, 1232. The first slot 1112 and the second slot 131 are used for accepting a first wire 51 connected to the voice coil 50. The first accepting groove 122 and the second accepting groove 132 are used for accepting a circuit board 15 as FIG. 2 shows. The first wire 51 is connected to the circuit board 15. The first wire 51 is connected to the circuit board 15. The first buckling groove 123 and the second buckling groove 141 are used for accepting a coupling portion 161 of a wire stopper 16 and the coupling portion 161 is disposed with at least two different heights of raised annular ribs 1611, 1612 as FIG. 2 shows. When the two raised annular ribs 1611, 1612 are respectively accepted in between the first cannelures 1231, 1232 and the second cannelures 1411, 1412, the wire stopper 16 is then allowed to retain between the first coupling groove 123 and the second coupling groove 141 and not to separate from the second portion 12. The wire stopper 16 is disposed with an axial through hole 162 used for accepting a second wire 17 connected to the circuit board 15.

The present invention allows a conventional earphone housing to be integrated with a housing of a speaker used in an earphone to be a main body to enable the main body to be used as a housing of a speaker so as to save the production material and cost of a speaker housing. Besides, a speaker assembly and an earphone assembly can be completed at one time such that the assembly cost of the earphone assembly can be reduced. Furthermore, a diameter of diaphragm can relatively be increased and a length of a front chamber of an earphone in front of the diaphragm can be shortened such that the bass quality can be elevated and the alt loss can be decreased because a thickness of a front end of the diaphragm is omitted. An allowance design is unnecessarily considered in the process of the speaker housing and the earphone housing assembly because the speaker housing is omitted. Besides, that a voice transmission loss is caused because a concentric circles coupling cannot be obtained during the speaker housing and earphone housing assembly will not happen.

According to the present invention, a resonant chamber is disposed at a rear end of the main body; a round iron is disposed with a second through hole and the main body is disposed with a first through hole communicated with the resonant chamber to allow sound wave generated from a vibration of the diaphragm to be transmitted to the resonant chamber and the sound wave is allowed to resonate through the resonant chamber to elevate the bass effect.

Figure 4:
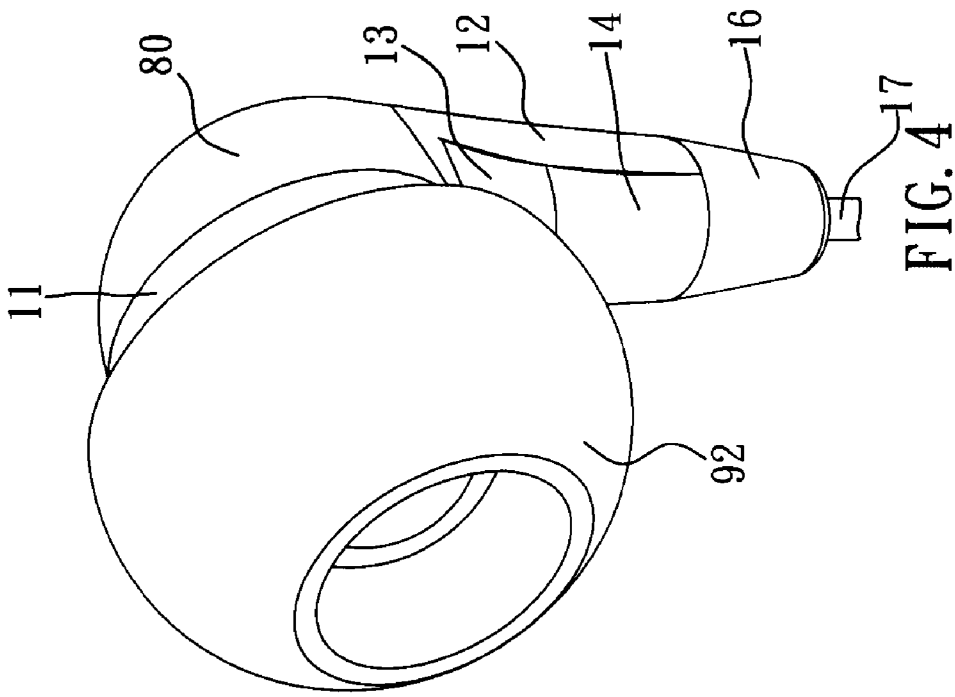
FIG. 4 is a perspective view, showing a front cover coupled to a second sound tube according to the present invention.
Figure 3:
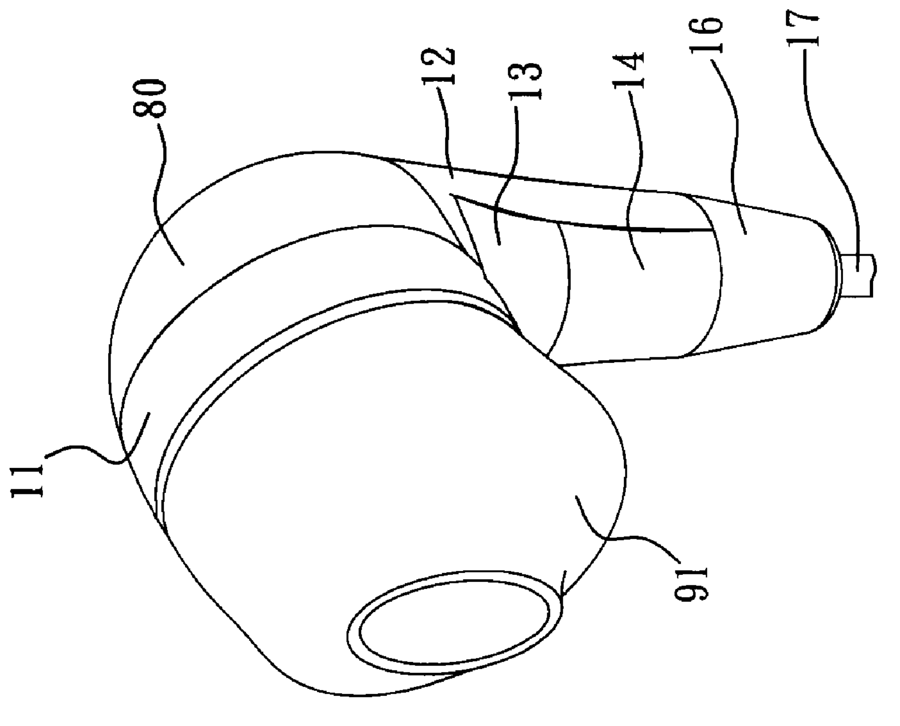
FIG. 3 is a perspective view, showing a front cover coupled to a first sound tube according to the present invention.

A front cover of the present invention may be coupled to the supra-aural silica gel-made first sound tube 91 as shown in FIG. 3, or the insert type silica gel-made second sound tube 92 as shown in FIG. 4 to provide a user with a different use demand.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speaker with an earphone function, comprising:

a main body, disposed with a first portion and a second portion, a lower end of said first portion being connected with a upper end of said second portion; a front end of said first portion being disposed with a first groove wall, a first platform, a second groove wall and a second platform connected to each other in sequence; said first groove wall being connected to said first platform to form a first groove; said second groove wall being connected to said second platform to form a second groove; said first groove and said second groove being communicated with each other; one end of said first groove wall being disposed with a first coupling unit;

a round iron, disposed with an accepting groove;

a magnet;

a washer, adhered to the magnet;

a voice coil;

a diaphragm, adhered to the voice coil;

a front cover, disposed with a front coupling unit, a rear coupling unit and a raised blocking portion; said raised blocking portion being placed inside said rear coupling unit; and a sound tube;

wherein, said round iron is placed in said second groove and extended up to said first groove, said magnet and said washer are placed in said accepting groove in sequence, said voice coil is put around peripheries of said magnet and said washer, said diaphragm is placed in front of said voice coil and said washer, said rear coupling unit is coupled to said first coupling unit, said raised blocking portion is pressed against said diaphragm, said front coupling unit is coupled to said sound tube.

2. The speaker with an earphone function according to claim 1, wherein said second platform is disposed with a through hole; said round iron is disposed with a second through hole; said second through hole and said first through hole are communicated with each other; said magnet and said washer respectively are annular; a rear end of said first portion is coupled to a rear cover to form a resonant chamber; said resonant chamber and said first through hole are communicated with each other.

3. The speaker with an earphone function according to claim 2, wherein said rear cover is curved.

4. The speaker with an earphone function according to claim 3, wherein said rear coupling unit and said first coupling unit respectively are a corresponding coupling groove and coupling tenon.

5. The speaker with an earphone function according to claim 3, wherein said sound tube is a supra-aural silica gel-made first sound tube.

6. The speaker with an earphone function according to claim 3, wherein said sound tube is a insert type silica gel-made second sound tube.

7. The speaker with an earphone function according to claim 4, wherein one end of said second portion is disposed with a third platform; said third platform is disposed with a first accepting groove; said third platform is coupled to a sheet cover; said sheet cover is disposed with a second accepting groove corresponding to said first accepting groove; said first accepting groove and said second accepting groove accept a circuit board; a first wire of said voice coil is connected to said circuit board.

8. The speaker with an earphone function according to claim 7, wherein a lower end of said first groove wall is disposed with a first slot; said sheet cover is disposed with a second slot corresponding to said first slot; said first slot and said second slot accept said first wire.

9. The speaker with an earphone function according to claim 8, wherein said third platform is disposed with a first buckling groove; said third platform is coupled to a blocking cover; said blocking cover is disposed with a second buckling groove corresponding to said first buckling groove; said first buckling groove and said second buckling groove accept a coupling portion of a wire stopper; said wire stopper is disposed with an axial through hole; said through hole accepts a second wire.

10. The speaker with an earphone function according to claim 9, wherein said first buckling groove is provided with at least two different depths of first cannelures, said second buckling groove is provided with at least two different depths of second cannelures, said coupling portion of said wire stopper is disposed with at least two different heights of raised annular ribs; said raised annular ribs are respectively accepted in said first cannelures and said second cannelures.

11. The speaker with an earphone function according to claim 5, wherein one end of said second portion is disposed with a third platform; said third platform is disposed with a first accepting groove; said third platform is coupled to a sheet cover; said sheet cover is disposed with a second accepting groove corresponding to said first accepting groove; said first accepting groove and said second accepting groove accept a circuit board; a first wire of said voice coil is connected to said circuit board.

12. The speaker with an earphone function according to claim 11, wherein a lower end of said first groove wall is disposed with a first slot; said sheet cover is disposed with a second slot corresponding to said first slot; said first slot and said second slot accept said first wire.

13. The speaker with an earphone function according to claim 12, wherein said third platform is disposed with a first buckling groove; said third platform is coupled to a blocking cover; said blocking cover is disposed with a second buckling groove corresponding to said first buckling groove; said first buckling groove and said second buckling groove accept a coupling portion of a wire stopper; said wire stopper is disposed with an axial through hole; said through hole accepts a second wire.

14. The speaker with an earphone function according to claim 13, wherein said first buckling groove is provided with at least two different depths of first cannelures, said second buckling groove is provided with at least two different depths of second cannelures, said coupling portion of said wire stopper is disposed with at least two different heights of raised annular ribs; said raised annular ribs are respectively accepted in said first cannelures and said second cannelures.

15. The speaker with an earphone function according to claim 6, wherein one end of said second portion is disposed with a third platform; said third platform is disposed with a first accepting groove; said third platform is coupled to a sheet cover; said sheet cover is disposed with a second accepting groove corresponding to said first accepting groove; said first accepting groove and said second accepting groove accept a circuit board; a first wire of said voice coil is connected to said circuit board.

16. The speaker with an earphone function according to claim 15, wherein a lower end of said first groove wall is disposed with a first slot; said sheet cover is disposed with a second slot corresponding to said first slot; said first slot and said second slot accept said first wire.

17. The speaker with an earphone function according to claim 16, wherein said third platform is disposed with a first buckling groove; said third platform is coupled to a blocking cover; said blocking cover is disposed with a second buckling groove corresponding to said first buckling groove; said first buckling groove and said second buckling groove accept a coupling portion of a wire stopper; said wire stopper is disposed with an axial through hole; said through hole accepts a second wire.

18. The speaker with an earphone function according to claim 17, wherein said first buckling groove is provided with at least two different depths of first cannelures, said second buckling groove is provided with at least two different depths of second cannelures, said coupling portion of said wire stopper is disposed with at least two different heights of raised annular ribs; said raised annular ribs are respectively accepted in said first cannelures and said second cannelures.

* * * * *